(12) United States Patent
Barrows et al.

(10) Patent No.: US 10,705,714 B2
(45) Date of Patent: Jul. 7, 2020

(54) SYSTEMS AND METHODS FOR GENERATING A CARD VIEW INTERFACE ON A MOBILE COMPUTING DEVICE

(71) Applicant: Smartsheet Inc., Bellevue, WA (US)

(72) Inventors: Christopher James Barrows, Kirkland, WA (US); Jonathan Sandler, Renton, WA (US)

(73) Assignee: Smartsheet Inc., Bellevue, WA (US)

(*) Notice: Subject to any disclaimer, the term of this patent is extended or adjusted under 35 U.S.C. 154(b) by 98 days.

(21) Appl. No.: 16/141,465

(22) Filed: Sep. 25, 2018

(65) Prior Publication Data

US 2020/0097151 A1    Mar. 26, 2020

(51) Int. Cl.
    *G06F 3/0486*    (2013.01)
    *G06F 3/0482*    (2013.01)

(52) U.S. Cl.
    CPC .......... *G06F 3/0486* (2013.01); *G06F 3/0482* (2013.01)

(58) Field of Classification Search
    CPC .............................. G06F 3/0482; G06F 3/0486
    See application file for complete search history.

(56) References Cited

U.S. PATENT DOCUMENTS

| | | | | |
|---|---|---|---|---|
| 2008/0187248 A1* | 8/2008 | Ikeda | ................... | H04N 1/0044 382/305 |
| 2012/0240071 A1* | 9/2012 | Park | ...................... | G06F 3/0488 715/769 |
| 2014/0380188 A1* | 12/2014 | Ishii | ...................... | G06F 3/0486 715/748 |
| 2015/0074539 A1* | 3/2015 | Hou | ....................... | G06F 3/0482 715/739 |
| 2015/0106760 A1* | 4/2015 | Axelsson | ............... | G06F 3/0483 715/781 |
| 2017/0124055 A1* | 5/2017 | Radakovitz | ........... | G06F 3/0482 |
| 2017/0235436 A1* | 8/2017 | Hooton | .................. | G06F 3/0482 705/7.11 |
| 2017/0285901 A1* | 10/2017 | DeMaris | ................ | G06F 3/0486 |
| 2019/0171915 A1* | 6/2019 | Reicher | .................... | G06K 9/66 |

* cited by examiner

*Primary Examiner* — Asher D Kells
(74) *Attorney, Agent, or Firm* — Christensen O'Connor Johnson Kindness PLLC (57) ABSTRACT

In some embodiments, a card view interface of tabular data is provided that is suitable for presentation on small displays such as those found on mobile computing devices. Cards from a single lane are displayed, along with a set of lane indicators. In some embodiments, when a drag operation is detected on a card, a size of the set of lane indicators is increased in order to facilitate dropping of the card on an intended lane indicator, thus helping to overcome the technical limitations of small mobile computing device displays.

20 Claims, 9 Drawing Sheets

|   | NAME | ROLE | ASSIGNED TASKS |
|---|------|------|----------------|
| 1 | DAVID | LEGAL | 4 |
| 2 | CLAIRE | LEGAL | 7 |
| 3 | CHRIS | INVENTOR | 2 |
| 4 | JON | INVENTOR | 5 |
| 5 | JOLENE | CORPORATE | 3 |
| 6 | KARA | CORPORATE | 8 |
| 7 | MARK | CORPORATE | 12 |
| 8 | BRUCE | INVENTOR | 1 |

SYSTEMS AND METHODS FOR GENERATING A CARD VIEW INTERFACE ON A MOBILE COMPUTING DEVICE

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of generating a card view presentation of tabular data for display by a mobile computing device is provided. An overall set of cards and a set of lanes representing data within a table in a tabular data store are determined. A first subset of cards of the overall set of cards associated with a first lane of the set of lanes is determined. The first subset of cards is provided for presentation by a display on the mobile computing device. A set of lane indicators representing the set of lanes is provided for presentation by the display on the mobile computing device. In response to detecting a drag operation on a card of the first subset of cards, a size of the set of lane indicators is increased to facilitate dropping the card onto a selected lane indicator.

In some embodiments, a non-transitory computer-readable medium having computer-executable instructions stored thereon is provided. The instructions, in response to execution by one or more processors of a mobile computing device, cause the mobile computing device to perform actions for presenting a card view of tabular data on a display of the mobile computing device. The actions comprise receiving, by the mobile computing device, a set of lane indicators representing a set of lanes; receiving, by the mobile computing device, a first subset of cards associated with a first lane of the set of lanes; presenting, by the mobile computing device, the set of lane indicators and the first subset of cards on a display of the mobile computing device; and in response to detecting a drag operation on a card of the first subset of cards, increasing, by the mobile computing device, a size of the set of lane indicators to facilitate dropping the card onto a selected lane indicator.

In some embodiments, a system for managing tabular data is provided. The system comprises one or more computing devices configured to: determine an overall set of cards and a set of lanes representing data within a table in a tabular data store; determine a first subset of cards of the overall set of cards associated with a first lane of the set of lanes; provide the first subset of cards for presentation by a display on a mobile computing device; provide a set of lane indicators representing the set of lanes for presentation by the display on the mobile computing device; and in response to detecting a drag operation on a card of the first subset of cards, increase a size of the set of lane indicators to facilitate dropping the card onto a selected lane indicator.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
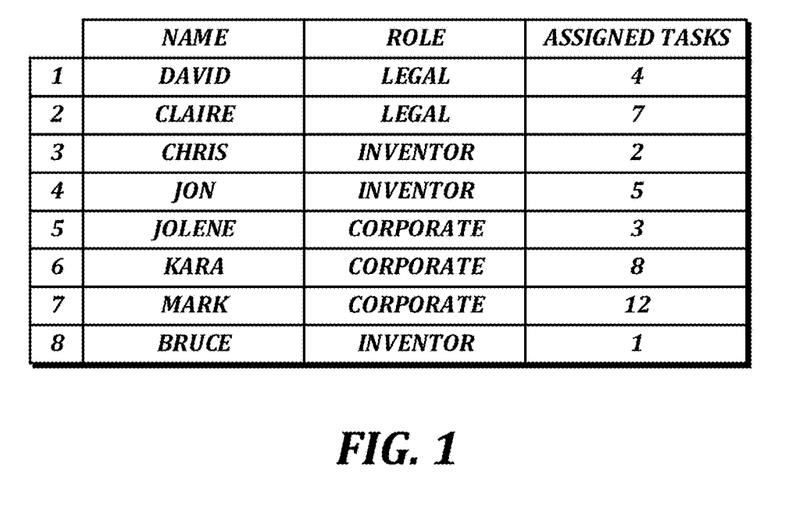
FIG. 1 illustrates an example of tabular data that may be stored in a tabular data system.

Tabular data systems can be used to organize and manipulate data. FIG. 1 illustrates an example of tabular data that may be stored in a tabular data system. As shown, data representing individuals, their roles within an organization, and the number of tasks assigned to each of the individuals is organized into a table. The table has a set of columns, each of which is associated with a column name. As shown, the table includes columns named "Name," "Role," and "Assigned Tasks." The table also includes a set of rows, each of which has been numbered for the ease of discussion. The intersection of a row and a column may be referred to as a cell.

In some embodiments, the numbering of each row may represent a unique identifier that can be used to uniquely reference each row. As illustrated, each row in the table is associated with an individual, and each column stores a type of data for the individual. For example, row 1 includes a value of "David" in the "Name" column, a value of "Legal" in the "Role" column, and a value of "4" in the "Assigned Tasks" column. Of course, the tabular data illustrated in FIG. 1 is an example only, and in other examples, more, fewer or different rows and/or columns may be present. In some embodiments, some cells may include static numerical or text values, while values in some cells may be calculated based on values in other cells.

In some embodiments of tabular data systems, the tabular data may be displayed in a table format similar to that shown in FIG. 1, or may be reorganized into another format that allows a more concise depiction of the data stored therein. Charts and graphs are some examples of concise depictions of data stored within tabular data systems, though charts and graphs are not always convenient for navigating the stored data. An improved format for summarizing tabular data for navigation is known as a "card view" format. In a card view, each row of the tabular data is presented as a "card," which displays a representative portion of the data stored in the row. The cards may then be further organized into "lanes" based on another portion of the data stored in each row. In some embodiments, one column is chosen to define the lanes. To do so, one lane is created for each value stored in the column. The cards are then sorted into the lanes based on which value is stored in the column for the row associated with the card. In some embodiments, another column may be chosen to indicate the representative portion of data stored in the row.

Figure 2:
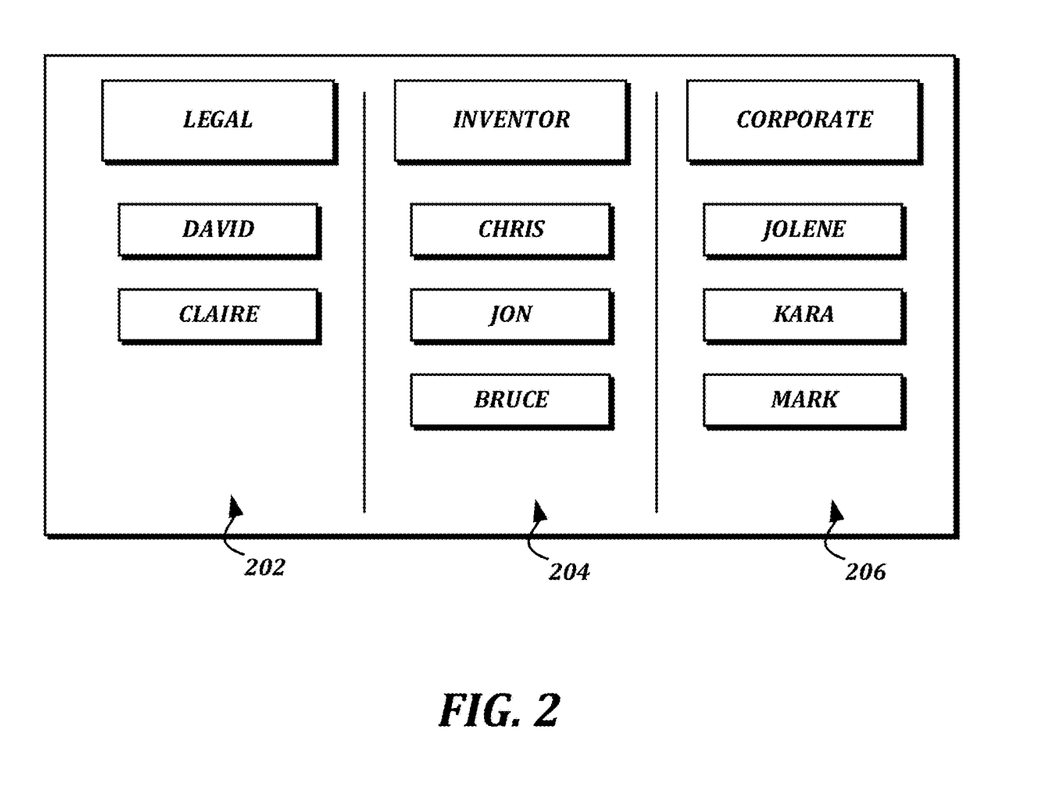
FIG. 2 illustrates an example of a card view display of the tabular data shown in FIG. 1.

FIG. 2 illustrates an example of a card view display of the tabular data shown in FIG. 1. In the card view shown in FIG. 2, the "role" column was chosen to define the lanes. As such, because the "role" column includes the values "Legal," "Inventor," and "Corporate," three lanes are created, one each to correspond to each of the values stored in the "role" column." A first lane 202 illustrates the cards for rows that include the value "Legal" in the "role" column, a second lane 204 illustrates the cards for rows that include the value "Inventor" in the "role" column, and a third lane 206 illustrates the cards for rows that include the value "Corporate" in the "role" column. Each lane is identified with a header that displays the value associated with the lane. Further, the "name" column was chosen to indicate the representative portion of data. Accordingly, each of the cards displays the value from the "name" column in the associated row. For example, row 3 of the table illustrated in FIG. 1 includes the value "Chris" in the "name" column, the value "Inventor" in the "role" column, and the value "2" in the "assigned tasks" column. As such, the card for row 3 displays the value "Chris" due to the value in the "name" column, and is organized into the second lane 204 due to the value in the "role" column. In some embodiments, clicking on, tapping, or otherwise interacting with a card in the card view causes further information from the associated row to be displayed.

The illustration of three lanes is an example only. In some embodiments, the number of lanes may be determined by the number of distinct values stored in the column chosen to define the lanes. In some embodiments, the values stored in the column chosen to define the lanes may be editable via a drop-down list when editing the values.

Figure 3:
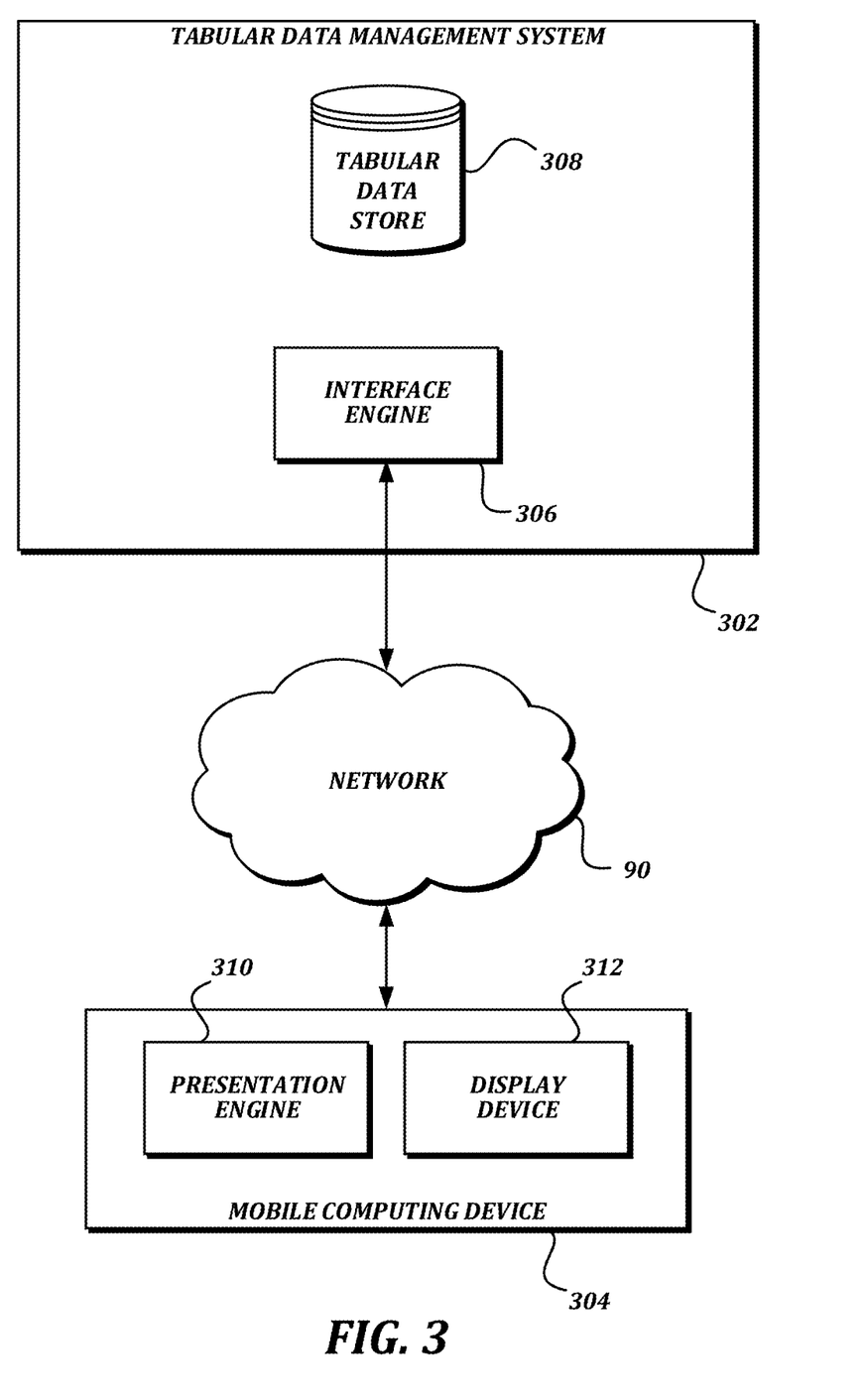
FIG. 3 is a schematic diagram that illustrates an example embodiment of a system for manipulating tabular data according to various aspects of the present disclosure.

FIG. 3 is a schematic diagram that illustrates an example embodiment of a system for manipulating tabular data according to various aspects of the present disclosure. As illustrated, the environment includes a tabular data management system 302 and a mobile computing device 304.

The tabular data management system 302 includes one or more computing devices configured to provide shared services for storing and manipulating tabular data. As shown, the one or more computing devices of the tabular data management system 302 are configured to provide a tabular data store 308 and an interface engine 306.

In some embodiments, the tabular data store 308 is configured to store tabular data and provide access to said data for other components of the tabular data management system 302. As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner, such as files in a file system, on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In some embodiments, the interface engine 306 is configured to provide one or more interfaces through which a user of the mobile computing device 304 can access tabular data stored by the tabular data management system 302. One example of an interface that may be provided by the interface engine 306 is a web-based interface accessible via a web browser that allows a user to access and manipulate the tabular data. Another example of an interface that may be provided by the interface engine 306 is an application programming interface (API) that allows programmatic access to the tabular data. The API may be coupled with a user interface provided by an application or engine executing on the mobile computing device 304 (such as the presentation engine 310) in order to provide access to the tabular data. In some embodiments, a combination of functionality executing on the server and functionality executing on the mobile computing device 304 may be used to provide the interface.

In general, the word "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine.

The mobile computing device 304 may be any type of computing device that is portable and capable of wireless communication with the network 90. A typical example of a mobile computing device 304 is a smartphone such as an Apple iPhone device, a Samsung Galaxy Note device, a Samsung Galaxy S device, or a Google Pixel device. Other examples of mobile computing devices 304 may include tablet computing devices such as an Apple iPad.

As illustrated, the mobile computing device 304 includes a presentation engine 310 and a display device 312. In some embodiments, the presentation engine 310 generates presentations of tabular data in coordination with the interface engine 306, and receives input from a user to manipulate the tabular data. The presentations are typically presented using the display device 312. In some embodiments, the display device 312 is a screen such as an OLED device, an AMOLED device, or other suitable device. In some embodiments, the display device 312 is also touch sensitive, such that a user can interact with information presented on the display device 312 using touches such as tapping, holding, swiping, and dragging. In some embodiments, the mobile computing device 304 also includes one or more other components of a computing device 900 as discussed further below.

As illustrated, the tabular data management system 302 and the mobile computing device 304 communicate via a network 90. The network 90 may include any type of wired or wireless communication technology or combinations thereof, including but not limited to Ethernet, Wi-Fi, WiMAX, Bluetooth, USB, 3G, 4G, LTE, and the Internet. In some embodiments, the network 90 may include multiple types of wired or wireless communication technology. As a non-limiting example, the mobile computing device 304 may connect to a wireless network access point using Wi-Fi, 3G, 4G, or LTE. The wireless network access point may be coupled to the Internet via Ethernet or other wired communication technology in order to communicate with the tabular data management system 302 (which may also be coupled to the Internet via Ethernet or other wired communication technology).

Though illustrated as including a single tabular data management system 302 and a single mobile computing device 304, in some embodiments, the environment may also include other devices that can communicate with tabular data management system 302, including but not limited to one or more desktop computing devices, one or more other data stores, and more than one mobile computing device 304.

Though card view presentations of tabular data are useful, problems exist when attempting to present and manipulate such views on mobile computing devices 304. As an example of a technical problem imposed by the use of mobile computing devices 304, the usable area of the display device 312 is limited. For example, the Apple iPhone 8 Plus has a 5.5 inch screen, measured along the diagonal. Apple recommends that a minimum usable size for an interactive interface control is about 44 pt×44 pt. 1 pt is equal to 1/72nd of an inch, which means the minimum size for an interactive interface control is about 5/8ths of an inch square. Due to the limited usable amount of space on the display, one technique for presenting a card view on a mobile computing device 304 is to display a single lane at a time. In this way, the cards may be presented at a sufficient size to allow them to be usable as interactive controls.

Figure 4:
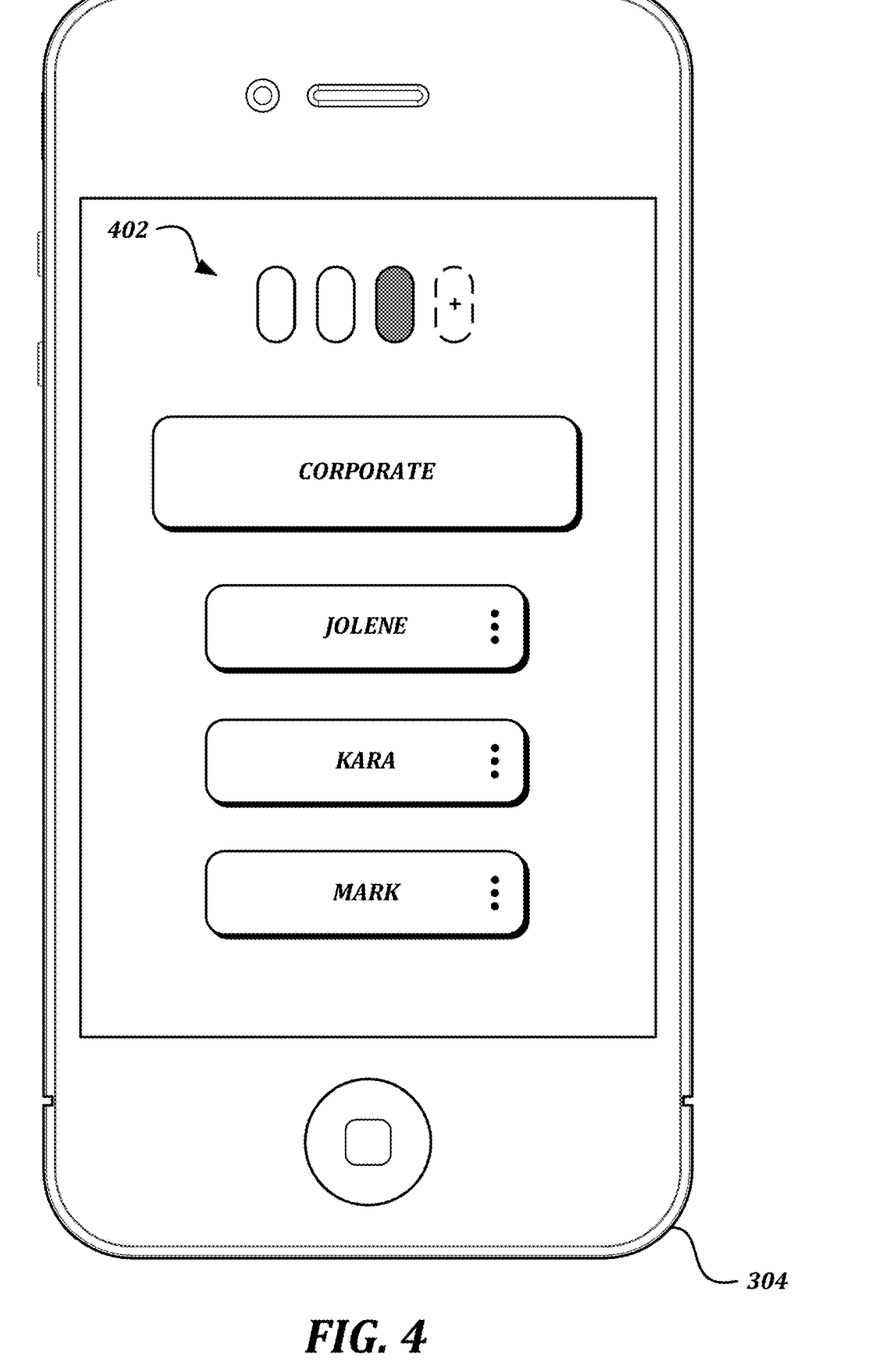
FIG. 4 is a schematic diagram that illustrates an example embodiment of a card view presentation on a mobile computing device according to various aspects of the present disclosure.

In card view presentations that show a single lane, it is desirable to present a set of lane indicators that suggest the total number of lanes present, as well as the current lane being displayed. However, in order to efficiently present the set of lane indicators within the card view without taking up an unwarranted amount of space within the display, the lane indicators may be sized smaller than the minimum usable size for an interactive interface control. FIG. 4 is a schematic diagram that illustrates an example embodiment of a card view presentation on a mobile computing device according to various aspects of the present disclosure. As shown, the mobile computing device 304 is presenting a card view interface showing the third lane 206 from FIG. 2, including a descriptive header card and cards for each row associated with the third lane 206. The card view interface also includes a set of lane indicators 402. The set of lane indicators 402 shows a darkened indicator for the third lane 206 to show that the third lane 206 is being presented. The set of lane indicators 402 also shows lightened indicators for the first lane 202 and the second lane 204 to show that those lanes are present in the data (but not displayed), as well as a dashed lane indicator to provide the possibility of creating a new lane. As shown, the lane indicators of the set of lane indicators 402 are of a size that is appropriate for indicating the overall number of lanes and which lane is being presented, but are smaller than the recommended size for an interactive interface element. As such, one of the primary benefits of a card view interface-being able to easily move cards from one lane to another-cannot be realized with this set of lane indicators 402.

Figure 5A:
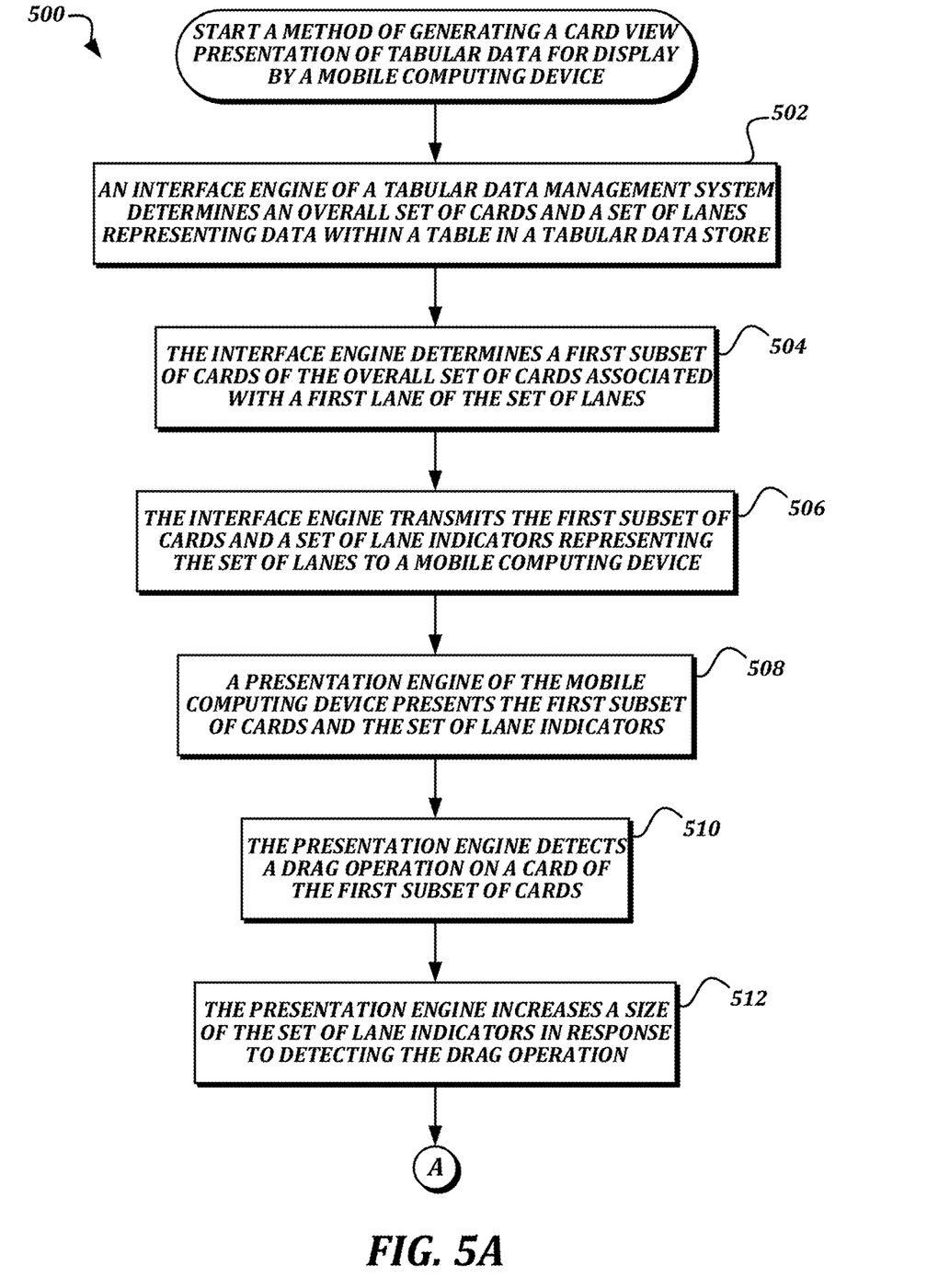
FIGS. 5A-5B are a flowchart that illustrates an example embodiment of a method of generating a card view presentation of tabular data for display by a mobile computing device according to various aspects of the present disclosure.
Figure 5B:
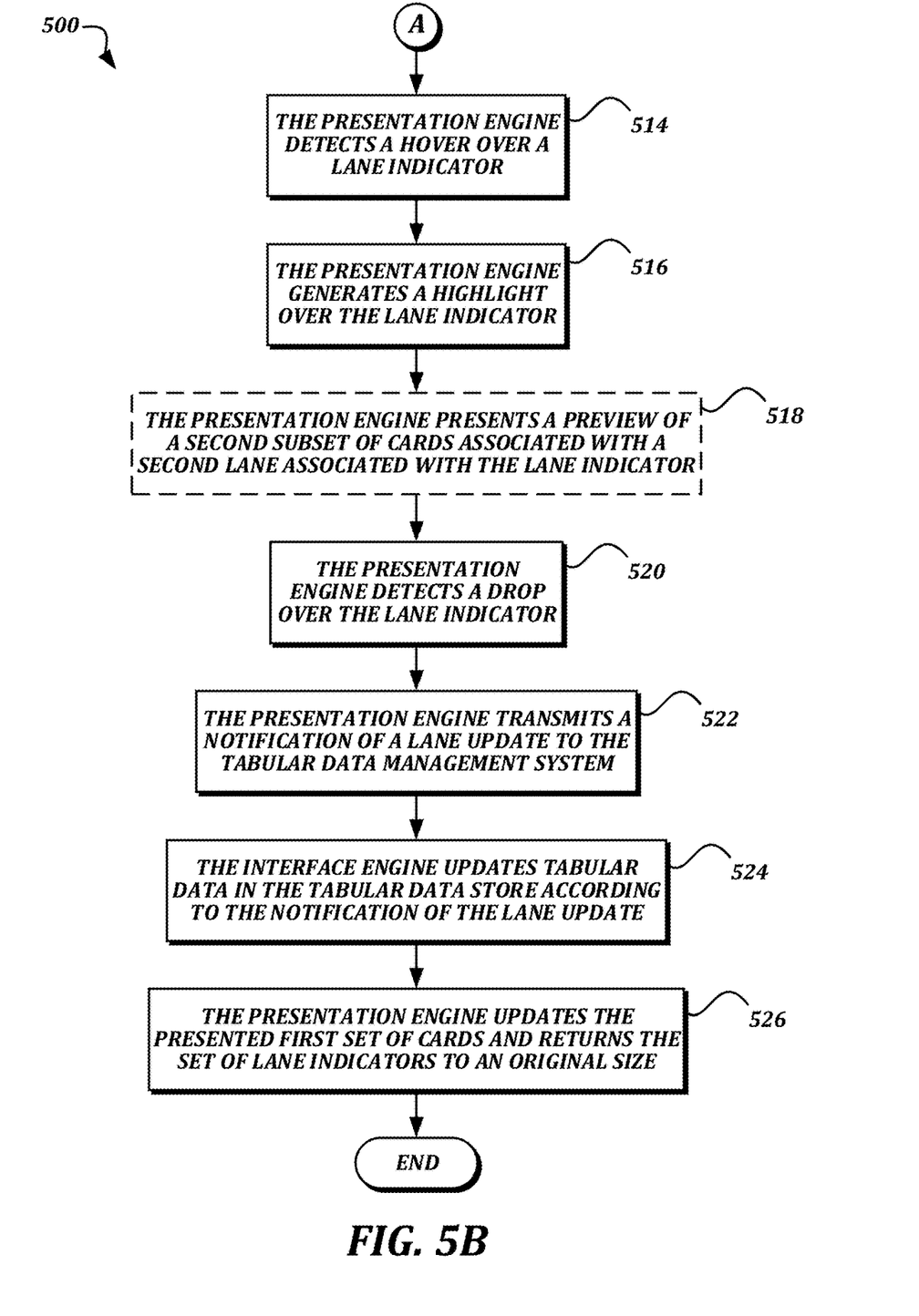

FIGS. 5A-5B are a flowchart that illustrates an example embodiment of a method of generating a card view presentation of tabular data for display by a mobile computing device according to various aspects of the present disclosure that helps address these technical problems. From a start block, the method 500 proceeds to block 502, where an interface engine 306 of a tabular data management system 302 determines an overall set of cards and a set of lanes representing data within a table in a tabular data store 308. As discussed above with respect to FIGS. 1 and 2, each card of the overall set of cards may represent a row of data within the table, and the set of lanes may be determined based on values stored in a first column of the table.

Next, at block 504, the interface engine 306 determines a first subset of cards of the overall set of cards associated with a first lane of the set of lanes. The first lane may be associated with a first value stored in the first column, and the first subset of cards are chosen based on cards that are associated with rows having the first value stored in the first column. For example, in FIGS. 1 and 2, the value "Legal" is associated with the first lane 202. The cards that are determined to be associated with the first lane 202 are those cards that are associated with row 1 and row 2 of the table in FIG. 1 because they include the value "Legal" in the "role" column.

At block 506, the interface engine 306 transmits the first subset of cards and a set of lane indicators representing the set of lanes to a mobile computing device 304. In some embodiments, the set of lane indicators representing the set of lanes are sized to optimize the information displayed by the set of lane indicators, and not to optimize the usability of the set of lane indicators as interactive controls. As such, the indicators of the set of lane indicators may be sized smaller than a minimum usable size for an interactive interface element, such as the set of lane indicators 402 illustrated in FIG. 4. In some embodiments, the interface engine 306 may transmit images or markup language information that can be rendered as the set of lane indicators 402. In some embodiments, the interface engine 306 may transmit information (such as a number of indicators to present and/or an indication of the lane indicator to highlight as being associated with the lane that is displayed) usable by the presentation engine 310 of the mobile computing device 304 to generate the set of lane indicators for presentation.

At block 508, a presentation engine 310 of the mobile computing device 304 presents the first subset of cards and the set of lane indicators. As discussed above, this presentation is generally performed using the display device 312, and may appear as illustrated in FIG. 4.

At block 510, the presentation engine 310 detects a drag operation on a card of the first subset of cards. The drag operation may include a user tapping and holding a handle of the card (or any other portion of the card) and moving their finger along the surface of the display device 312. During the drag operation, the card may be animated to follow the touched point of the display device 312. At block 512, the presentation engine 310 increases a size of the set of lane indicators in response to detecting the drag operation. By increasing the size of the set of lane indicators to at least the minimum recommended size, the presentation engine 310 can make the lane indicators suitable for use as interactive interface elements. While this may clutter the rest of the interface, it greatly enhances the usability of the interface for an operation in which a card is to be dropped on one of the lane indicators in order to move the card to a new lane. In some embodiments, the size increase may maintain the aspect ratio of the lane indicators, while in some embodiments, the size increase may increase the size of the lane indicators in one dimension but not in another dimension. In some embodiments, the change in size may also include changing a distance between the lane indicators to be larger or smaller. In some embodiments, the size increase may cause the set of lane indicators to no longer fit within the area of the display device 312, in which case dragging the card near the edge of the screen may cause the set of lane indicators to scroll to display lane indicators that are beyond the edge of the screen.

Figure 6:
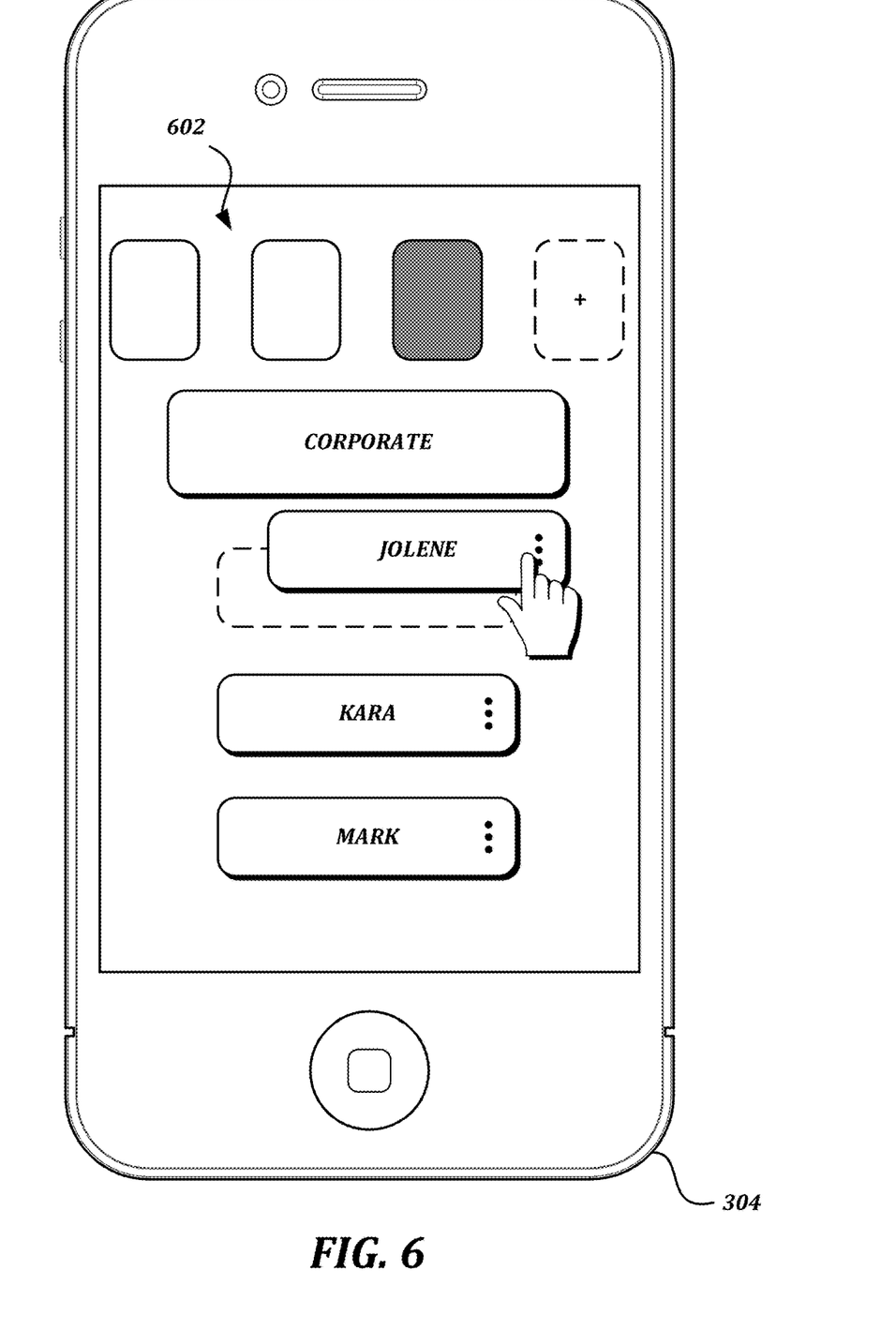
FIG. 6 illustrates an example embodiment of an interface presented by a mobile computing device in response to having detected a drag operation according to various aspects of the present disclosure.

FIG. 6 illustrates an example embodiment of an interface presented by a mobile computing device 304 in response to having detected a drag operation according to various aspects of the present disclosure. The interface illustrated in FIG. 6 shows how the interface illustrated in FIG. 4 may change in response to having detected a drag operation. As shown, a user is dragging the card associated with the value "Jolene," which has been animated to move from its original position to track the touch point. The original position of the card is indicated in broken line, which may show a location in which the user may drop the card in order to avoid making any changes to the underlying data. The set of lane indicators 602 has been increased from its original, compact size to a size that is large enough to support an interactive user action. In other words, the lane indicators of the set of lane indicators 602 are large enough for the user to accurately drop the card onto a selected indicator. In embodiments where more than three lanes were present in the data, more than four lane indicators may be present in the set of lane indicators 602 (associated with the three lanes within the data plus an indicator that allows creation of a new lane), and so dragging the card near the edge of the display device 312 would cause the set of lane indicators 602 to scroll horizontally to display the lane indicators that were not currently being displayed.

Returning to FIG. 5A, the method 500 then proceeds to a continuation terminal ("terminal A"). From terminal A (FIG. 5B), the method 500 proceeds to block 514, where the presentation engine 310 detects a hover over a lane indicator. In some embodiments, a hover may be detected when the touch point of the drag operation is determined to be within the lane indicator (or within a predetermined distance of the lane indicator). In some embodiments, a hover may be detected when a predetermined portion of the card, such as a handle, is determined to have been moved over the lane indicator. At block 516, the presentation engine 310 generates a highlight over the lane indicator. This highlight helps show to the user which lane indicator has been detected as being associated with the hover operation. In some embodiments, the process of generating the highlight may include changing a shade, color, and/or brightness of the associated lane indicator. In some embodiments, the process of generating the highlight may include further increasing the size of the lane indicator, changing the location of the lane indicator (such as by moving it up or down within the display by a predetermined amount), causing the lane indicator to blink, presenting a border around the lane indicator, animating the lane indicator, or using any other suitable technique of emphasizing the lane indicator. In some embodiments, detecting an end of the hover without detecting a drop may result in the highlight being removed.

At optional block 518, the presentation engine 310 presents a preview of a second subset of cards associated with a second lane associated with the lane indicator. To present the preview of the second subset of cards, some embodiments of the presentation engine 310 may request the second subset of cards from the interface engine 306 of the tabular data management system 302 using an identifier of the lane indicator, using a technique similar to that used to receive the first subset of cards. Some embodiments of the presentation engine 310 may receive the overall subset of cards from the interface engine 306, in which case the presentation engine 310 may itself use an identifier of the lane indicator to determine the second subset of cards from the overall set of cards. In some embodiments, the preview may be presented in response to detecting the hover over the lane indicator. In some embodiments, the presentation of the preview may be delayed until a preview-triggering event is detected. For example, a delay of a predetermined amount of time, such as one second, may be used as a preview-triggering event, such that the preview presentation is not provided unless the hover is maintained for at least one second. As another example, the preview-triggering event may include detection of a level of force of the touch on the display device 312, such as a peek gesture or a pop gesture. In some embodiments, detecting an end of the hover without detecting a drop causes the first subset of cards to be presented again. The block 518 is illustrated and described as optional because in some embodiments, the preview functionality may not be provided, or the functionality may be provided but not activated during the method 500.

Figure 7:
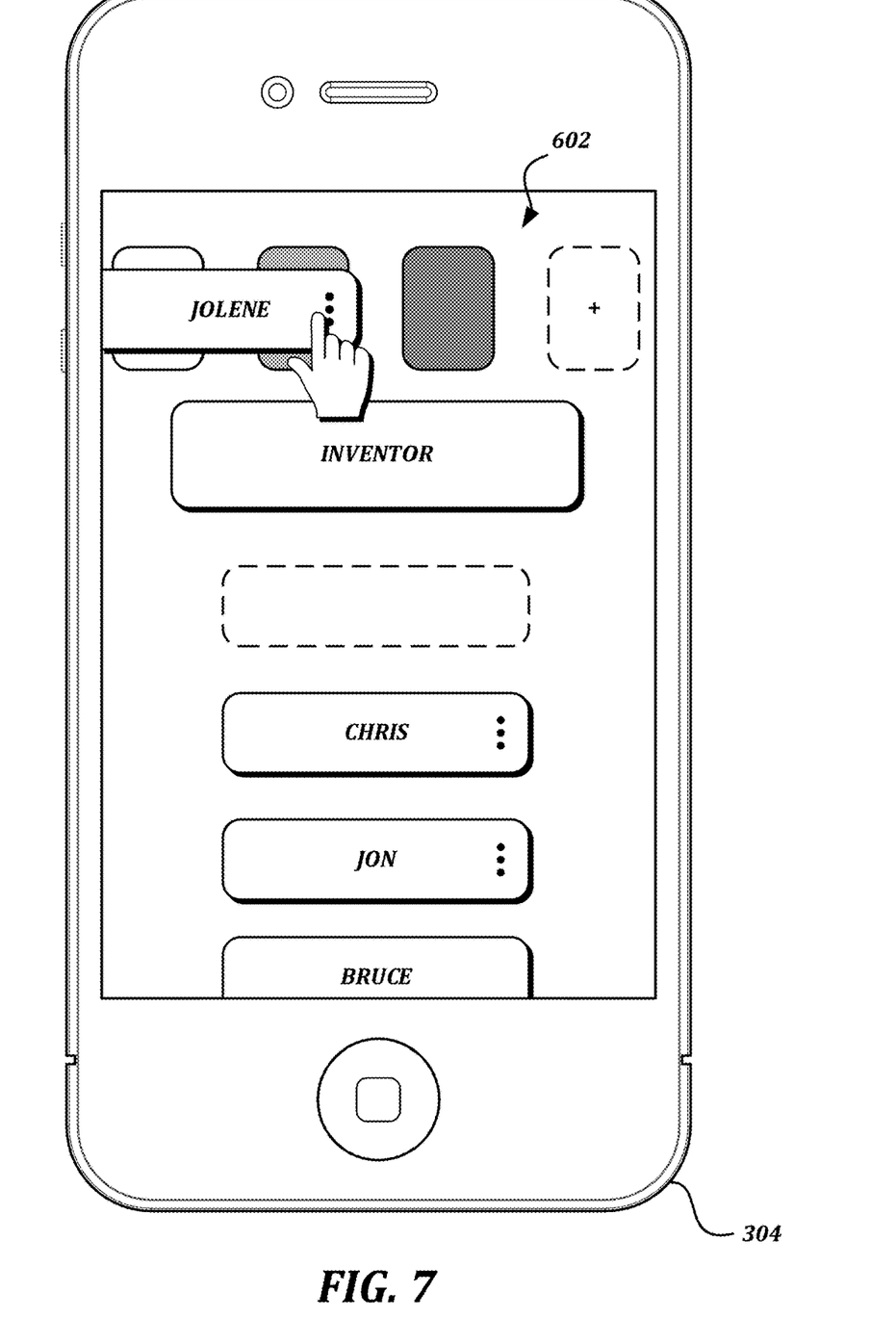
FIG. 7 illustrates an example embodiment of an interface presented by the mobile computing device in response to detecting a hover over a lane indicator according to various aspects of the present disclosure.

FIG. 7 illustrates an example embodiment of an interface presented by the mobile computing device 304 in response to detecting a hover over a lane indicator according to various aspects of the present disclosure. As shown, the set of lane indicators 602 has retained its increased size, and the touch point is moved over a second lane indicator of the set of lane indicators 602. As shown, the second lane indicator has been highlighted by changing its color to a color darker than the other lane indicators (but lighter than the lane indicator associated with the first lane from which the card is being moved). Further, FIG. 7 illustrates the presentation of a preview of the second lane. The header has been changed from the original "Corporate" header associated with the first lane and illustrated in FIG. 6, to the "Inventor" header associated with the second lane, and cards associated with the second lane have replaced the cards associated with the first lane. The preview also includes a dotted line area that indicates a position in which the dragged card may be dropped within the second lane.

Returning to FIG. 5B, at block 520, the presentation engine 310 detects a drop over the lane indicator. In some embodiments, a drop is detected when the touch on the display device 312 is released (that is, when the user removes their finger from the display device 312). In response to the detection of the drop operation, at block 522, the presentation engine 310 transmits a notification of a lane update to the tabular data management system 302. Logically, the lane update causes the card to be moved from the first lane to the lane associated with the lane indicator. The notification of the lane update may include an identifier usable to identify the card (and/or its underlying data) and an identifier usable to identify the lane associated with the lane indicator (such as an identifier of the lane, the value associated with the lane, or an identifier of the lane indicator).

At block 524, the interface engine 306 updates tabular data in the tabular data store 308 according to the notification of the lane update. In some embodiments, the interface engine 306 may determine a row associated with the card, and may then change the value in the column used to determine the lane to the value associated with the new lane.

For example, upon receiving the notification of the lane update based on the interface illustrated in FIG. 6, the interface engine 306 may determine that row five (FIG. 1) is to be updated, and may change the value in the "role" column from "Corporate" to "Inventor" (the value associated with the new lane).

Figure 8:
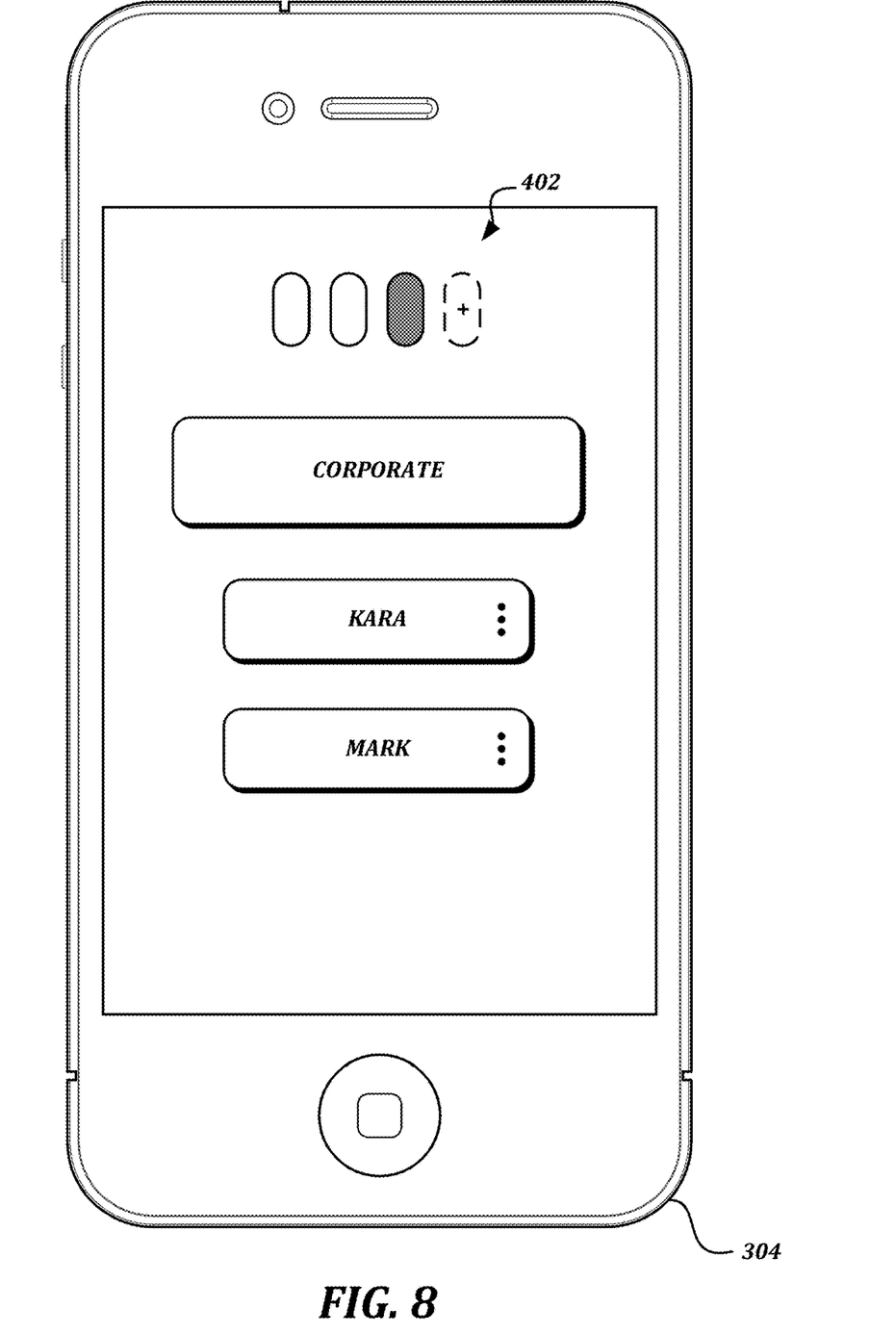
FIG. 8 illustrates an example embodiment of an interface presented by the mobile computing device 304 after the tabular data has been updated according to various aspects of the present disclosure.

At block 526, the presentation engine 310 updates the presented first set of cards and returns the set of lane indicators to an original size. In some embodiments, the presentation engine 310 may request and receive the updated first set of cards from the interface engine 306 as in block 506 and/or block 518, because the tabular data management system 302 acts as an authoritative source for the stored tabular data and would have the most accurate version. In some embodiments, the presentation engine 310 may avoid such a request and may simply remove the dropped card from the displayed set of cards. In some embodiments, the presentation engine 310 may update the presentation to show the second lane instead of the first lane after the drop. FIG. 8 illustrates an example embodiment of an interface presented by the mobile computing device 304 after the tabular data has been updated according to various aspects of the present disclosure. As described with respect to block 326, the set of lane indicators 402 has returned to its original size, and the presented set of cards has been updated to remove the card that was dragged and dropped into the second lane.

Returning to FIG. 5B, the method 500 then proceeds to an end block and terminates.

The use of separate devices and distribution of tasks between the tabular data management system 302 and the mobile computing device 304 provides certain benefits, including but not limited to the ability to share the data storage and management functions of the tabular data management system 302 amongst multiple mobile computing devices 304. However, the separation of tasks as described above is an example only. In some embodiments, the entirety of the processing described above may be performed by the mobile computing device 304, such that the tasks associated with the interface engine 306 and the presentation engine 310 are all performed by the mobile computing device 304, and the tabular data management system 302 may merely provide the tabular data store 308 for persistent storage. In some embodiments, the mobile computing device 304 may include both the tabular data store 308 and the interface engine 306, in which case the tabular data management system 302 may be omitted.

Figure 9:
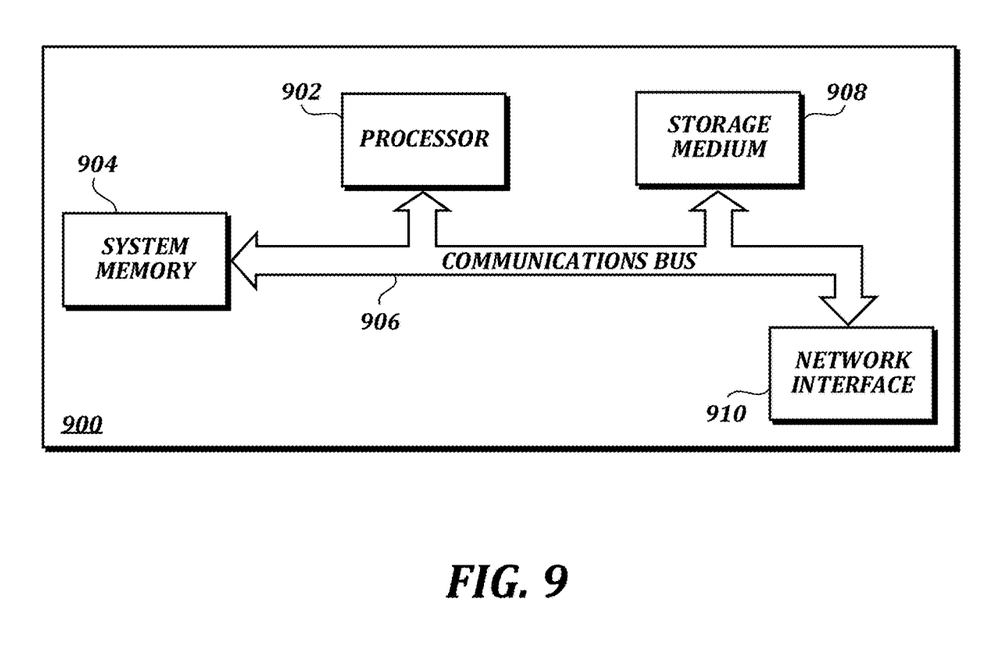
FIG. 9 is a block diagram that illustrates aspects of an exemplary computing device 900 appropriate for use with embodiments of the present disclosure.

FIG. 9 is a block diagram that illustrates aspects of an exemplary computing device 900 appropriate for use with embodiments of the present disclosure. While FIG. 9 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 900 may be any one of any number of currently available or yet to be developed devices.

In its most basic configuration, the computing device 900 includes at least one processor 902 and a system memory 904 connected by a communication bus 906. Depending on the exact configuration and type of device, the system memory 904 may be volatile or nonvolatile memory, such as read only memory ("ROM"), random access memory ("RAM"), EEPROM, flash memory, or similar memory technology. Those of ordinary skill in the art and others will recognize that system memory 904 typically stores data and/or program modules that are immediately accessible to and/or currently being operated on by the processor 902. In this regard, the processor 902 may serve as a computational center of the computing device 900 by supporting the execution of instructions.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as Wi-Fi, 2G, 3G, LTE, WiMAX, Bluetooth, and/or the like.

In the exemplary embodiment depicted in FIG. 9, the computing device 900 also includes a storage medium 908. However, services may be accessed using a computing device that does not include means for persisting data to a local storage medium. Therefore, the storage medium 908 depicted in FIG. 9 is represented with a dashed line to indicate that the storage medium 908 is optional. In any event, the storage medium 908 may be volatile or nonvolatile, removable or nonremovable, implemented using any technology capable of storing information such as, but not limited to, a hard drive, solid state drive, flash memory, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 904 and storage medium 908 depicted in FIG. 9 are merely examples of computer-readable media. Computer-readable media can be used to store data for use by programs. Accordingly, the terms "electronic spreadsheet," "grid," "table," "cell," "spreadsheet data," "sheet data," "column," "row," and others used herein describe display formats and logical inter-relationships for information stored on a computer-readable medium of a computing device 900.

Suitable implementations of computing devices that include a processor 902, system memory 904, communication bus 906, storage medium 908, and network interface 910 are known and commercially available. For ease of illustration and because it is not important for an understanding of the claimed subject matter, FIG. 9 does not show some of the typical components of many computing devices. In this regard, the computing device 900 may include input devices, such as a keyboard, keypad, mouse, microphone, touch input device, touch screen, tablet, and/or the like. Such input devices may be coupled to the computing device 900 by wired or wireless connections including RF, infrared, serial, parallel, Bluetooth, USB, or other suitable connections protocols using wireless or physical connections. Similarly, the computing device 900 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer-readable storage medium associated with a computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of generating a card view presentation of tabular data for display by a mobile computing device, the method comprising:
   determining an overall set of cards and a set of lanes representing data within a table in a tabular data store;
   determining a first subset of cards of the overall set of cards associated with a first lane of the set of lanes;
   providing the first subset of cards for presentation by a display on the mobile computing device;
   providing a set of lane indicators representing the set of lanes for presentation by the display on the mobile computing device; and
   in response to detecting a drag operation on a card of the first subset of cards, increasing a size of the set of lane indicators to facilitate dropping the card onto a selected lane indicator.

2. The method of claim 1, further comprising, in response to detecting a drop operation of the card on the selected lane indicator, decreasing the size of the set of lane indicators to an original size.

3. The method of claim 2, wherein the table includes a plurality of rows and at least a first column;
   wherein the rows of the plurality of rows include a first set of rows having a first value in the first column and a second set of rows having a second value in the first column; and
   wherein determining the first subset of cards of the overall set of cards associated with a first lane of the set of lanes includes determining rows having the first value in the first column.

4. The method of claim 3, further comprising, in response to detecting a drop operation of the card on the selected lane indicator:
   determining a row of the first set of rows associated with the card; and
   changing a value in the first column of the determined row from the first value to a value associated with the selected lane indicator.

5. The method of claim 1, further comprising:
   detecting a hover operation over a second lane indicator associated with a second lane of the set of lanes;
   determining a second subset of cards of the overall set of cards associated with the second lane; and
   providing the second subset of cards for presentation by the display on the mobile computing device.

6. The method of claim 1, wherein the set of lane indicators includes a highlighted lane indicator associated with the first lane.

7. The method of claim 1, wherein the mobile computing device is a smartphone.

8. A non-transitory computer-readable medium having computer-executable instructions stored thereon that, in response to execution by one or more processors of a mobile computing device, cause the mobile computing device to perform actions for presenting a card view of tabular data on a display of the mobile computing device, the actions comprising:
   receiving, by the mobile computing device, a set of lane indicators representing a set of lanes;
   receiving, by the mobile computing device, a first subset of cards associated with a first lane of the set of lanes;
   presenting, by the mobile computing device, the set of lane indicators and the first subset of cards on a display of the mobile computing device; and
   in response to detecting a drag operation on a card of the first subset of cards, increasing, by the mobile computing device, a size of the set of lane indicators to facilitate dropping the card onto a selected lane indicator.

9. The computer-readable medium of claim 8, wherein the actions further comprise, in response to detecting a drop operation of the card on the selected lane indicator, decreasing the size of the set of lane indicators to an original size.

10. The computer-readable medium of claim 9, wherein the tabular data includes a plurality of rows and at least a first column;
    wherein the rows of the plurality of rows include a first set of rows having a first value in the first column and a second set of rows having a second value in the first column; and
    wherein the actions further comprise, in response to detecting a drop operation of the card on the selected lane indicator:
      determining a row of the first set of rows associated with the card; and
      changing a value in the first column of the determined row from the first value to a value associated with the selected lane indicator.

11. The computer-readable medium of claim 8, wherein the actions further comprise:
    detecting a hover operation over a second lane indicator associated with a second lane of the set of lanes;
    receiving a second subset of cards associated with the second lane; and
    presenting the second subset of cards for presentation on the display of the mobile computing device.

12. The computer-readable medium of claim 8, wherein the set of lane indicators includes a highlighted lane indicator associated with the first lane.

13. The computer-readable medium of claim 8, wherein the mobile computing device is a smartphone.

14. A system for managing tabular data, the system comprising one or more computing devices configured to:
    determine an overall set of cards and a set of lanes representing data within a table in a tabular data store;
    determine a first subset of cards of the overall set of cards associated with a first lane of the set of lanes;
    provide the first subset of cards for presentation by a display on a mobile computing device;
    provide a set of lane indicators representing the set of lanes for presentation by the display on the mobile computing device; and
    in response to detecting a drag operation on a card of the first subset of cards, increase a size of the set of lane indicators to facilitate dropping the card onto a selected lane indicator.

15. The system of claim 14, wherein the one or more computing devices are further configured to, in response to detecting a drop operation of the card on the selected lane indicator, decrease the size of the set of lane indicators to an original size.

16. The system of claim 15, wherein the table includes a plurality of rows and at least a first column;
   wherein the rows of the plurality of rows include a first set of rows having a first value in the first column and a second set of rows having a second value in the first column; and
   wherein determining the first subset of cards of the overall set of cards associated with a first lane of the set of lanes includes determining rows having the first value in the first column.

17. The system of claim 16, wherein the one or more computing devices are further configured to, in response to detecting a drop operation of the card on the selected lane indicator:
   determine a row of the first set of rows associated with the card; and
   change a value in the first column of the determined row from the first value to a value associated with the selected lane indicator.

18. The system of claim 14, wherein the one or more computing devices are further configured to:
   detect a hover operation over a second lane indicator associated with a second lane of the set of lanes;
   determine a second subset of cards of the overall set of cards associated with the second lane; and
   provide the second subset of cards for presentation by the display on the mobile computing device.

19. The system of claim 14, wherein the set of lane indicators includes a highlighted lane indicator associated with the first lane.

20. The system of claim 14, wherein the mobile computing device is a smartphone.

* * * * *